US012257193B2

(12) United States Patent
Albert

(10) Patent No.: US 12,257,193 B2
(45) Date of Patent: Mar. 25, 2025

(54) HEAD CAP

(71) Applicant: BRUMABA GMBH & CO. KG, Geretsried (DE)

(72) Inventor: Michael Albert, Wolfratshausen (DE)

(73) Assignee: BRUMABA GMBH & CO. KG, Geretsried (DE)

( * ) Notice: Subject to any disclaimer, the term of this patent is extended or adjusted under 35 U.S.C. 154(b) by 206 days.

(21) Appl. No.: 17/998,859

(22) PCT Filed: May 6, 2021

(86) PCT No.: PCT/EP2021/062036
§ 371 (c)(1),
(2) Date: Nov. 15, 2022

(87) PCT Pub. No.: WO2021/233691
PCT Pub. Date: Nov. 25, 2021

(65) Prior Publication Data

US 2023/0190563 A1 Jun. 22, 2023

(30) Foreign Application Priority Data

May 20, 2020 (DE) ..................... 10 2020 113 723.0

(51) Int. Cl.
*A61G 13/12* (2006.01)

(52) U.S. Cl.
CPC ......... *A61G 13/121* (2013.01); *A61G 13/126* (2013.01)

(58) Field of Classification Search
None
See application file for complete search history.

(56) References Cited

U.S. PATENT DOCUMENTS

| | | | |
|---|---|---|---|
| 4,178,038 A | 12/1979 | Yada et al. | |
| 2007/0163049 A1 | 7/2007 | Brinkerhoff et al. | |
| 2018/0235824 A1 * | 8/2018 | Nordgren | A61G 13/121 |

FOREIGN PATENT DOCUMENTS

| | | |
|---|---|---|
| CN | 110812097 A | 2/2020 |
| DE | 28 10 864 A1 | 9/1978 |
| EP | 2 722 029 A2 | 4/2014 |
| JP | 2011-232326 A | 11/2011 |

OTHER PUBLICATIONS

International Search Report issued in PCT/EP2021/062036; mailed Sep. 1, 2021.

* cited by examiner

*Primary Examiner* — Adam C Ortiz
(74) *Attorney, Agent, or Firm* — Studebaker & Brackett PC

(57) ABSTRACT

The invention relates to a head cap, for placement of a head of a person. The head cap comprises a support shell with an inner face facing the head and an outer face facing away from the head and a cover shell with an inner face facing the head and a outer face facing away from the head, wherein at least the inner face of the support shell is optionally at least along an outer edge of the inner face, preferably over the entire surface, cushioned with a cushion layer and is covered by a flexible cover layer which encloses the inner face and extends up to the outer face of the support shell at least in a peripheral support shell edge region, wherein at least one cover layer edge is covered by the cover shell.

20 Claims, 6 Drawing Sheets

A-A

A-A

HEAD CAP

BRIEF DESCRIPTION OF DRAWINGS

The invention will be explained again in detail below using examples of embodiment with reference to the attached figures. The same components in the various figures are given identical reference numbers. The figures are generally not to scale. In these:

The invention relates to a head cap for supporting a head of a person, a method of its production and use, as well as a head supporting device with such a head cap and an item of treatment furniture with such as head cap.

Figure 1:
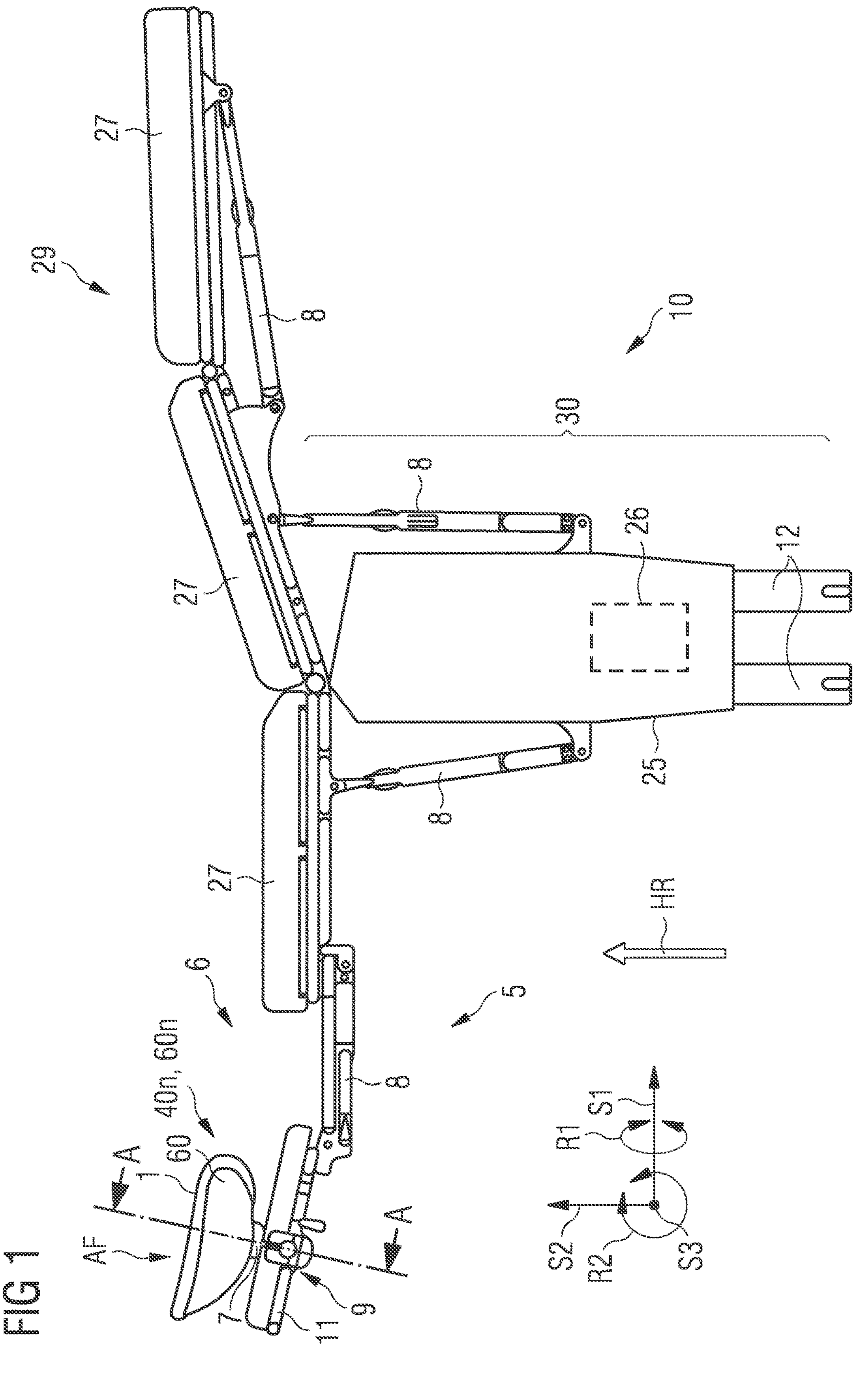

Head caps are supporting devices for the head of any person or other living creature. Such devices are available in different forms and embodiments. Originally, the term cap goes back to the shape of a (spherical) hood or skull cap (calotte). Mathematically, a "calotte" is a curved area of a spherical section, spherical segment or spherical shell. Accordingly, a head cap is taken to mean a counterpart in terms of shape and size to a head that is to be supported. Such head caps are mostly used in medical, cosmetic or similar treatments in order to be able to support the head of the person to be treated, i.e. the patient, in a calm and stable manner. Accordingly, a point on the head to be treated, determines how the head should be supported. There are head caps on which the head rests supported laterally. Equally, there are head caps in which the head is arranged with the face facing the head cap in a circular opening within the head cap, and there are some in which essentially the back of the head is supported in a closed, concave inner face of the head cap. The present invention relates in particular to such head caps into which the back of the head and/or the face can be placed. The preferred example of embodiment shown in the figures below involves a head cap which is designed both for the back of the head (as a (back of the) head cap) and for the face side (as a face cap). Here, either the back of the head or the forehead of the user rests in a concave head support surface of the head cap, whereby the nape cut-out provides space either the for neck or nape, or for the nose and/or mouth. Therefore, in the following simply the term head cap is used, whereby both a face head cap and also a (back of the) head cap is meant. Because of their main use in conventional medical and/or cosmetic treatments or also in related disciplines, such head caps are subject to particularly high quality, hygiene and comfort requirements.

In solutions already known from practice, such head caps comprise multipart covers, with one cover part being sewn and adhered to the concave inner face. A section of this cover part stretched over an outer edge to the outer face is then on the outer face welded or connected along a seam to a second cover part covering the remainder of the outer face. In this way, a both optically and hygienically unfavourable or disadvantageous transition is created on the outer face of this head cap, at which special effort is required to remove any residues and to achieve a possibly required sufficient level of sterility.

It is therefore an aim of the present invention to set out an improved head cap, which after use can be cleaned more easily and with less residue.

This task is solved by way of a head cap according to claim 1 and a method of its production according to claim 10, as well as a head placement device with such a head cap according to claim 7 and an item of treatment furniture with such a head cap according to claim 9.

The head cap according to the invention comprises a support shell and a cover shell. These shells are planar, shell-shaped structures, i.e. in the direction of their shell surface they have comparatively large dimensions, whereas their extent in a direction perpendicular to the shell surface, i.e. their thickness, is relatively small. A shell therefore has two planar faces, namely an inner face which during intended use faces the head of the person to be supported and a corresponding outer face on the rear facing away from the head of the person. In their basic form, the shells are preferably matched to each other in such a way that their surfaces on the outer face and inner face essentially extend in parallel to each other when they are assembled together. Due to its function of placing or receiving the head, as well as because of the associated surface shape of a head, the inner face (at least indirectly) in contact with the head is concave and the rear outer face is convex in each case. The shells are arranged in relation to each other in such a way that the inner face of the cover shell directly or indirectly adjoins the outer face of the support shell.

The terms "support shell" and "cover shell" have been selected here as they roughly reflect the basic function of the respective shell or layer of the head cap. The support shell serves as the shaping basis or as supporting element, the cover shell serves as both an optical screen and also as a continuous, one-part cover of a part of the head cap.

The inner shape and dimensions of the head cap are selected in such a way that they are suitable for one age group, i.e. for children, adolescents or adults for example. They are dimensioned so that the head of the respective age group is supported comfortably on the one hand, and as stably and firmly as possible on the other hand. The actual dimensions of the inner face of the support shell are selected to be larger and wider than the outer dimensions of the head or back of the head to be supported in order to create space for optional cushioning, as will be explained below. Through the slightly funnel-shaped design, different skull shapes and sizes can thus be supported with optimal pressure distribution.

In accordance with the invention, the inner face of the support shell is covered or enclosed by a flexible cover layer. This cover layer can be arranged on the inner face of the support shell in such a way that it forms a yielding, soft support for the head.

Thus, for example, at least in a central area of the head support surface (away from the peripheral outer edge—if the preferred cushion layer, still to be explained below, is not used—it could span the inner face of the support shell at a small distance from the flexible cover layer (like a "hammock" so to speak) so that through the slightly yielding cover layer an elastic head support surface can already be formed. For this, this cover layer, e.g. artificial leather or another material as will be set out below, can extend from the inner face at least up to a peripheral support shell edge region of the outer face of the support shell. In the context of of the invention, such a peripheral support shell edge region of the outer face is taken to mean a section on the outer face of the support shell running along an outer edge (between the inner face and outer face) of the support shell. It thus defines a "strip" of strip-like edge region which is covered by the cover layer which is still wrapped over the outer edge of the support shell and thereby slightly tensioned. In other words, the cover layer is pulled over the outer edge of the support shell onto the outer face.

Optionally or preferably, the head cap can comprise a cushion layer as even more comfortable cushioning which cushions at least the inner face of the support shell. In the context of the invention, a “cushion layer” is taken to mean a damping, elastic support area or cushion or similar. In the case of an additional, full-area, cushion layer on the inner face of the support shell, the cover layer encloses the cushion layer and the support shell, wherein the cover layer is in direct, full-area, contact with the cushion layer and indirectly adjoins the support shell.

In accordance with the invention, at least one peripheral cover layer edge of the cover layer, i.e. at least one edge section of the part of the cover layer which on pulling the cover layer over the outer edge of the support shell comes to rest on its rear side, is covered by the aforementioned cover shell in the support shell edge region of the outer face of the support shell. Here,—essentially starting from an imagined line extending at a small distance (e.g. max. 20 mm, preferably max. 10 mm) from the outer edge of the support shell along the outer edge—within the peripheral support shell edge region, i.e. not entirely from the outer face of the support shell to a midpoint of the outer face of the support shell, the outer face is covered by the cover shell.

With the design according to the invention, it is achieved that the head cap is, overleaf or completely, surrounded or covered by an essentially continuous, partially overlapping layer or shell. In the fully assembled state, the cover layer edge is covered which is why the design has neither visible seams nor unnecessary overhangs, so that the risk of impurities of residues adhering there is greatly reduced and cleaning is made considerably easier.

As reflex-like, jerky movements can certainly occur during a treatment, particularly in intricate treatments or applications, it is a matter of the head being placed as stably or firmly as possible. As the head cap according to the invention is cushioned and enclosed, the head of a person can be held in place as stably and firmly as possible.

In addition to a head cap, a head placement device according to the invention, also comprises a holding mechanism, preferably a lockable ball joint and a height adjustment system for adjustable positioning of the head cap.

An item of treatment furniture according to the invention, more particularly a treatment table (e.g. operating table) or treatment chair (e.g. operating chair) comprises a head cap according to the invention, preferably said head placement device.

In addition to the advantages already cited above, through this it is achieved that the person or living creature, in particular the head of the person or living creature can be comfortably and firmly positioned in different treatment positions, which is important for the stated treatments or applications. Furthermore, it is also achieved that a head of a person on such treatment furniture which has been placed in the head cap can, at least within the scope of the natural mobility of the neck, advantageously be gently and without jerking aligned or positioned in an exactly defined manner even during on-going work. Accordingly, longer interventions or treatments can be carried out.

Such advantages are also achieved by the use according to the invention of the head cap according to the invention for placing a head of a person on an item of treatment furniture, more particularly on a treatment table or treatment chair. In the case of tables or chairs as a working surface in general, and treatment or operating tables for invasive and non-invasive procedures in particular, the head cap according to the invention, provides treatment conditions that are as ergonomic as possible, i.e. spatially, time-optimised and for the person as well as the operator, particularly comfortable, non-tiring or even damaging. Preferably, such treatment furniture also comprises at least one height adjustment, often also further positioning possibilities in order to achieve a beneficial working position. Therefore, the treatment furniture according to the invention, more particularly a treatment table, comprises a number of lifting feet (also known as lifting legs or lifting shafts) and/or joints, preferably for the height positioning of the entire person to be treated or of certain limbs.

The process for producing a head cap indicated in the introduction, comprises the following steps:

First of all, a support shell is provided. A cover shell is also provided. Thereafter, a flexible cover layer and, optionally, a cushion layer are provided. “Provision” of these parts, can, for example, include manufacturing of the respective parts or also the acquisition of parts produced elsewhere.

Preferably the raw materials of the cover layer and the optional cushion layer can, depending on the desired layer thickness, be made of sheets or strips of the respective materials and finished as sheet or film sections. Which raw materials or materials are suitable for manufacturing the head cap are set out further below.

The steps described above can be performed in any order.

At least one inner face of the cover shell is then covered by the cover layer and the support shell is thus enclosed or covered from the inner face up to a peripheral edge region of the support shell as described in more detail below.

Optionally, the inner face can, before enclosure by the cushion layer, be cushioned with the cushion layer at least along an outer edge of the support shell. Preferably, the inner face of the support shell can, at least in sections, preferably over the entire surface, be cushioned with the cushion layer, wherein the cushion layer is preferably cut with a certain oversize relative to the dimensions of the inner face of the support shell so that when applying the cushioning an overhang projects beyond the inner face of the support shell. For example, a transitional area from the inner face to the outer face of the support shell, i.e. the inner face along the outer edge of the support shell, can thus be cushioned with the cushion layer in a bulge-like manner around the outer edge.

Alternatively, depending on the material used, the cushion layer can also be applied in a different way, e.g. adhesion, foaming, injection or suchlike. In doing so, the cushion layer can either be applied in a shaping manner, or the desired shape is only achieved or created during enclosure with the cover layer as described below.

As stated above, the inner face, preferably the cushion layer on the inner face, is thus enclosed with the cover layer at least up to a support shell edge region of an outer face of the support shell, wherein preferably, the aforementioned overhang of the cushion layer is turned over the outer edge of the support shell towards the back in parallel to the outer face, so that the outer edge (between the inner face and outer face) of the support shell is surrounded by a cushion bulge, as will be set out below. The cushion layer can, for example, be adhered to the support shell, preferably both to the support shell and the cover layer. Equally, at least close to the peripheral outer edge, the cover layer could, if required, be directly connected, preferably adhered on the inner face, at least without a layer in between, such as the cushion layer, so that in a central area of the head support surface, the flexible cover layer still extends or is tensioned at a small distance above the support shell.

Finally, at least one peripheral cover layer edge is covered with the cover shell on the outer face of the support shell.

However, the method according to the invention is not restricted to the described steps. Other optional, advantageous procedural steps that can also be included in or envisaged by the method, are set out in more detail below.

Due to the design with two shells, a support shell and a cover shell, the head cap can be produced without costly seams and can thus be manufactured more quickly and, in terms of working time, more cost-effectively. In the manufacturing process according to the invention, the individual components of the head cap according to the invention can be produced and provided in several manufacturing steps, essentially independently of each other, wherein the components can also only be subsequently assembled in accordance with the design according to the invention. Moreover, it is both optically appealing and particularly hygienic, as hardly any residues remain here, or if they do, they can be easily removed without leaving residues.

Further, particularly advantageous embodiments and further developments of the invention are set out in the dependent claims as well as in the following description, wherein the independent claims of a claims category can also be further developed in an analogue manner to the dependent claims of another claims category, and, in particular, individual features of different examples of embodiment can be combined to form new examples of embodiment.

The head cap according to the invention can, in principle, be used on all treatment tables and treatment chairs, for example in medical technology or medical treatment (thus, for example, in surgery, by dentists and oral surgeons and in aesthetic procedures in head surgery and every other procedure on the head, in ophthalmology, i.e. in eye treatments or eye operations), meridian treatment, acupuncture, physiotherapy and/or osteopathy or for cosmetic treatments.

The invention is also not restricted to closed (i.e. whole, without a through opening in the surface) head caps for the back of the head. A head cap can primarily also be produced as a face cap, wherein then the cap-shaped support shell and the cap-shaped cover shell are designed with a small cut-out, or a through opening, at least for the nose and/or mouth for breathing. In addition, space for the functionality of using a respiratory mask can already be integrated into the face cap. The shape of such a head cap or face cap can, depending on the size of the opening, largely be described as a "ring-shaped bulge".

In this case, the cover layer—as has already been described above for the support shell edge region outside—can also be pulled from the inner face of the support shell around the inner edge of the cut-out into an inner support shell edge region on the outer face of the support shell. Similarly, at least one peripheral cover layer edge of the cover layer, which on pulling the cover layer around the inner edge of the support shell comes to rest on its rear side, can be covered by the cover shell (with a corresponding, larger cut-out) in the inner support shell edge region of the outer face of the support shell. The inner support shell edge region—in the case of such a cut-out in the support shell—can preferably also comprise a recess strip on the outer face of the support shell, preferably as is also formed in the outer support shell edge region of the support support shell.

There are various possibilities for selecting suitable materials for the head cap.

In the case of the raw material of the cover layer, it is mainly a matter of a suitable surface that can be easily shaped. For example, this involves artificial leather which is particularly cost-effective and simple to manipulate. Additionally, or alternatively, the cover layer can be made with a high-quality, robust or resistant upper material, for example plastic (as artificial leather with a PUR or PVC coating, as a film, as a silicone layer etc.), metal, inorganic material or organic material such as leather that also has a particularly comfortable or smooth surface. Particularly preferably, at least one material layer can be water-repellent. Very particularly preferably, the cover layer can be made of a water-repellent material. Most preferably, at least one material layer can be waterproof so that, if possible, no moisture enters the interior of head cap.

In the case of the cushion layer, it is less a matter of the surface, but good cushioning and filling properties instead. It consists, for example, of one or more soft, yielding but elastic materials, such as polyurethane (PU) foams, viscoelastic foams ("memory foams"), gels, 3-D printed structural damping and other foam-like or damping materials which particularly increase the supporting or lying comfort. Suitable as material of the cushion layer are also materials to which foam can be added, such as artificial leather made of PVC, silicone or other synthetic materials, woven materials, films or leather etc. Using materials with such properties, movements that typically occur during the treatment, such as twitching or shaking of the head, can be attenuated as the head is held stably in the finished, cushioned head cap. Additionally, the risk of the formation of pressure points (decubitus) can be reduced.

In order to further reduce possible sharp edges and to improve the head cap optically, the support shell edge region of the outer face of the support shell can also be cushioned.

Preferably, the head cap can be cushioned with the cushion layer in such a way that by way of the cushion layer extending over the outer edge of the support shell, a particularly cushioned cushion bulge is formed.

The thickness of the cushion bulge can be randomly selected in accordance with the desired requirements.

Preferably the cushion bulge can be three times, particularly preferably, four times as thick as the support shell wall thickness. Under the cover layer, i.e. between the support shell and cover layer, the cushion bulge can fill out perpendicularly or normally to the inner faces in the area of the outer edge, more particularly in the area of a nape cut-out (explanation below) of the support shell. "Fill out" is taken to mean here that the cushion bulge is thicker, i.e. the cushion thickness increases, so that in the area of the cushion bulge the head is held in a more confined manner with an increasing amount of cushion material. In this way the comfort for placing the head can be further improved.

Various raw materials can be used for the support shell and the cover shell.

For example, for the support shell acrylonitrile butadiene styrene (ABS), polyurethane (PU), polycarbonate (PC), polyvinyl chloride (PVC), wood, metal or similar material can be used. Particularly preferably, medically approved materials lend themselves for this.

Preferably, the cover shell can be made of a smooth, preferably particularly easy to clean material. Suitable for this are, for example, ABS or other inorganic materials.

A raw material for the support shell and the cover shell can preferably also be the same.

However, individual processing steps can, of course, differ from each other. For example, the surfaces of the support shell and the cover shell can be differently prepared or also finished, e.g. painted, smoothed, roughened or similar.

If the head cap—as preferred—is produced over its full extent with smooth, easy to clean layers and shells that overlap each other, it can be particularly easy and quick to clean after each use without leaving any residue.

There are also different possibilities for designing and arranging individual components of the head cap.

Preferably the head cap can be enclosed by the cover layer and the cover shell in such a way that it thereby offers protection on all sides against spray water, i.e. it is protected against spray water (in the case of ISO 20653) in accordance with protection rating IPX4. Particularly preferably, the head cap can even be sealed and designed (i.e. the individual components can be so tightly connected to each other) so that it provides protection against strong spray water (protection rating IPX6), very particularly preferably even continuous submersion (protection rating IPX8).

In addition to the processing steps of the production process set out above, as has been stated, further, optional production steps can be envisaged. Optionally, for example, fastening means, more particularly adhesives, can be provided or produced in order to additionally connect individual components of the head cap to other components of the head cap. Here, connecting means the permanent joining together of at least two elements.

Optionally, as has been mentioned, for example the cover layer can be fastened on the outer face in a support shell edge region on the support shell, preferably adhered, welded, bonded or stapled to the support shell in an area essentially along the aforementioned imagined or "virtual" peripheral line, before at least one cover layer edge is covered by the cover shell. This virtual line can be covered by the cover shell (i.e. the line is therefore located radially within a peripheral edge of the cover shell). In this way, the connections in the head cap are covered so that they are optically hidden.

Preferably the support shell can thus be directly or indirectly connected (i.e. by way of material layers arranged underneath it), while enclosing part of the cover layer, at least to the peripheral edge of the cover shell. Particularly preferably, the support shell can be adhered to the cover shell and/or the cover layer.

Alternatively, or additionally, the cover shell can be directly or indirectly fastened to the support shell by way of screws, rivets or suchlike, as will be explained below by means of an example. Other suitable means of fastening are, for example, welding, pressing, adhering, clipping or interlocking connection e.g. in an injection moulding process.

Preferably, at least on the inner face of the support shell, the cover layer can be seamless, i.e made of continuously cut material, which is particularly preferably essentially matched to the shape of the head support surface of the head cap. For example, this cut material can be connected on the inside with the cushion layer so that it retains its shape. Preferably, the cover layer—if at least in sections a cushion layer is used—can, as has been mentioned, be adhered over its entire surface on the side facing the inner face of the support shell with the cushion layer beneath it and/or the support shell.

Preferably, the outer face of the support shell of the head cap is completely protected by the cover shell and cover layer against the surroundings of the head cap. As mentioned, the cover shell can preferably be tightly connected to the cover layer, i.e. essentially sealed against spray water or at least protected against spray water, particularly preferably can be waterproof.

Preferably the head cap can have a recess strip in the support shell edge region of the support shell to receive the edge of the cover shell. As the name already implies, the recess strip is recessed relative to the immediate surroundings, therefore forming a channel or groove, for example, which extents all around the outer face of the support shell (at a small distance from the outer edge of the support shell). As the recess strip is located in the support shell edge region, it is, as has already been mentioned, covered by the cover layer, which is preferably slightly pretensioned after being pulled around the edge of the support shell and fastened on the rear side of the support shell (more particularly also permanently if the cover layer has essentially been connected to the support shell along the aforementioned imagined line). "Receiving the edge" is taken to mean here that at least a foremost part (a type of peripheral peak) of the edge of the cover shell protrudes into the recess strip and thereby fastens the cover layer stretched over the recess strip or pushes it into the recess strip. In this way the cover layer can be additionally tensioned by the edge of the cover shell protruding into the channel, so that the formation of folds in the area of the outer edge of the support shell, where the cover layer is pulled or taken from the inner face to the outer face of the support shell, can be reduced even further.

In addition, an almost flush transition between the cover layer and the cover shell is formed (as the cover shell protrudes into the recess strip), which reduces or prevents snagging by a user or also the depositing of undesirable residues. The required sealing tightness of the transition between the cover layer and cover shell is thus achieved more easily.

Accordingly, in the method of producing the head cap with a recess strip in the support shell edge region, the cover layer can preferably be fixed in the recess strip in the support shell edge region of the support shell in such a way that in a ready assembled state the recess strip is at least partially, preferably completely spanned by the cover layer. Partially spanned here does not refer to the path along the recess strip, but to a direction perpendicular to the longitudinal extension direction of the recess strip, i.e. how broadly the cover layer essentially evenly covers the recess strip all round.

Preferably, the degree of tensioning for this can also be varied. This is because in principle the cover layer can also be placed or stretched over the recess strip with only minimal pre-tensioning, and is only definitively fixed during the course of covering by the cover shell, in that the "pressing in depth" or penetration depth of the edge of the cover shell into the recess strip in the edge area is adjusted. Apart from adjusting the pressing in depth due to the shape of the support shell and the cover shell in this area, the pressing pressure, for example, when connecting the support shell with the cover shell, e.g. during adhesion, can be adjusted as required.

Therefore, as stated, in particular the desired sealing in the area of the recess strip between the cover shell and cover layer can also be automatically achieved in that the aforementioned connection of the cover shell to the support shell takes place under suitable pressing pressure.

As has been mentioned, the dimensions of the recess strip can also be varied for this. For example, the recess strip can be around 5 mm wide.

Preferably the recess strip is wider than it is deep. A depth of around 1 to 2 mm can already be sufficient to receive the edge of the cover shell in accordance with the above. However, depending on the thickness of the cover layer used or the cover layer material, it can be deeper, at least if when being applied, the cover shell is to press a thicker cover layer into the recess strip.

If the recess strip is 5 mm wide and is thus 5 mm from the outer edge of the support shell, for the turnover or overlap of the cover layer on the outer face pulled from the inner to the outer face of the support shell, a length of 10 mm can already be sufficient. The cover layer can then still partially be placed over the recess strip and the recess strip can thus be covered with slight pre-tensioning.

For receiving the neck or nape of a person more comfortably and ergonomically, the cap-shaped head cap can comprise a cut-out or nape cut-out. Preferably, the shape of the nape cut-out can be formed or created three-dimensionally in such a way that the head support surface gently rises in a funnel-shaped manner from the midpoint (i.e. in the area of the nape cut-out) towards the outer edge, and the outer edge in the area of the nape cut-out thus is or extends only slightly higher compared to the midpoint of the head support surface in order to particularly ergonomically support the (anatomically determined) slightly curved course of the neck. Optionally, for this, in both the support shell and the cover shell of the head cap, essentially congruent nape cut-outs can be left out or formed that preferably extend to the midpoint in a gaussian bell-shaped manner. In other words, the outer edge or the head cap in the area of the nape cut-outs runs from a level that remains constant in the remaining circular course to a (in an intended arrangement) lower level, i.e. approximately in the form of a gaussian curve, which with its "peak" extends three quarters to the central midpoint of the head support surface of the head cap.

The nape cut-outs can, for example, be milled out of the two cap shells or shells by means of a suitable milling machine, e.g. starting from the original outer edge of the support shell or the edge of the cover shell.

Additionally, through three-dimensional shaping of the head cap, the shape can be created in such a way that in the nape area a slight elevation of the described cut-outs is achieved. The background for this is a support function for the nape, or if shaped accordingly, for the neck.

Fundamentally, depending on their initial material, the support shell and the cover shell are produced in a suitable manufacturing process, for example, milled, punched, moulded, produced in an injection moulding process or machining process.

Preferably the production of the support shell and/or the cover shell—as at least one step—includes, particularly preferably negative, thermoforming (thermoforming process) of a corresponding sheet-like (or film-like) material blank. For example, in one operation, with correspondingly shaped positive moulded parts, the support shell and the cover shell can each be separately "drawn" or moulded into cap-shaped hemispheres as part of the thermoforming process. Essentially, in such a thermoforming process—as known in detail to a person skilled in the art—by way of heat, the material used is pliably and then possibly under pressure through the moulded part brought into or "drawn" into the desired "negative shape" of the moulded part. The support shell and/or cover shell can then be milled out of the thermoformed sheet material, wherein preferably the milling contour is selected so that simultaneously the nape cut-out is also appropriately milled out.

In the case of other, e.g. the aforementioned materials, the nape cut-outs can be moulded on of in, or directly integrated in the injection moulding process. A machining process can also be used for example.

Particularly preferably, the production in said thermoforming process also includes, at the same time, i.e. in the previously described thermoforming process operation, the moulding in of a recess strip in a support shell edge region of the outer face of the support shell by way of a corresponding integrated positive raised strip in the above-described moulded part.

Preferably, the peripheral edge of the cover shell, particularly preferably at least in the area of the aforementioned nape cut-out can also be formed, particularly preferably milled, in such a way that the edge, in said connection between the support shell and cover shell in the ready assembled state tightly rests on the cover layer in the recess strip over almost the entire surface. For this, the course of the edge can be designed accordingly so that everywhere at least one part of the surface of the cover shell is in planar contact in places. In other words, the edge is adapted to the respective contact surface, e.g. obliquely at one point, at right angles at another point or similar.

In order to fundamentally make the head cap easier to assemble, for example on a treatment table or treatment chair, above all also in a releasable manner, the head cap can be designed as follows:

Preferably, the support shell and the cover shell can each comprise at least one fastening hole or boring. These are preferably arranged in such a way that when joining or connecting the two shells together they are in alignment with each other. However, the invention is not restricted to this type of fastening.

Alternatively, when assembled on the treatment table or treatment chair, the head cap could also be adhered to the relevant components. As a further alternative, on the head cap a fastening pin could be moulded or injected externally onto the cover shell that can then be used to assemble the head cap on the relevant component of an item of treatment furniture.

Preferably, the support shell and the cover shell each have two fastening holes or borings, assigned to each other and at a distance from one another, which are particularly preferably arranged so that the fastening holes assigned to each other are in common alignment with each other when the two shells are joined together or connected. Particularly preferably, in one direction of the head cap the fastening holes can be arranged at a distance from one another that in the case of correct arrangement of the person with their head on the head cap, corresponds with the course or longitudinal direction of the neck from the upper body to the head.

In a support shell as well as cover shell provided for subsequent assembly, the fastening holes are preferably already incorporated. Optionally, however, they can also be incorporated in another production step of the present production process before assembly.

Particularly preferably, the fastening holes of the support shell can also comprise a thread, for example also a metal thread insert, for fastening screws. This can, for example, also be incorporated or screwed into the respective fastening holes in a further, optional production step.

By way of these fastening holes, a holding mechanism for the above-described head placement device can be simply attached to the head cap in order to be able to specifically position the head cap by means of the holding mechanism.

Preferably, positioning of the head placement device can take place at least in two directions. In this way the head placement device can be advantageously turned or repositioned upwards or downward or to both sides. In the case of a person placed on treatment furniture with their head placed in the head cap, these directions of rotation correspond with the following usually used movement instructions that can be heard, for example, during permanent make-up treatment, tattooing or also massages as well as surgical procedures (in which the patient is conscious): the upwards direction of rotation corresponds to a movement of the head "Please place your chin on your chest", the downwards direction of movement corresponds to a movement of the head "Please place your head in your nape" and the two lateral directions of rotation correspond to a rotational movement of the head "Please turn your head to the right/left to the respective shoulder".

For this, the holding mechanism can preferably comprise a ball joint, which provides the aforementioned advantages and, in particular, also allows oblique directions of rotation.

Alternatively or additionally, the holding mechanism can comprise positioning means for positioning the head cap. Positioning of the head placement device can therefore take place in at least two spatial directions. The two spatial directions can, for example, be a horizontal spatial direction parallel to the floor—(in the case of a treatment table this would be the horizontal direction perpendicular to a lying direction or the longitudinal direction of the table)—as well as a vertical spatial direction perpendicular to the floor or floor surface on which the treatment furniture is set up or arranged.

Particularly preferably, by means of the positioning means, the head cap can be positioned in three orthogonal spatial directions. For this, the positioning means can comprise, for example, a plurality of arm sections connected in an articulated manner and/or one telescopic arm section.

With the described features, the head cap according to the invention can, if need be with slight modification, advantageously be retrofitted into already existing treatment furniture. Equally, it is possible to equip newly to be produced treatment furniture with a head cap according to the invention during production itself.

The invention will be explained again in detail below using examples of embodiment with reference to the attached figures. The same components in the various figures are given identical reference numbers. The figures are generally not to scale. In these:

FIG. 1 shows a rough schematic side view (in partial cross-section) of an example of embodiment of an item of treatment furniture according to the invention comprising a head placement device with a head cap according to the invention.

Figure 2:
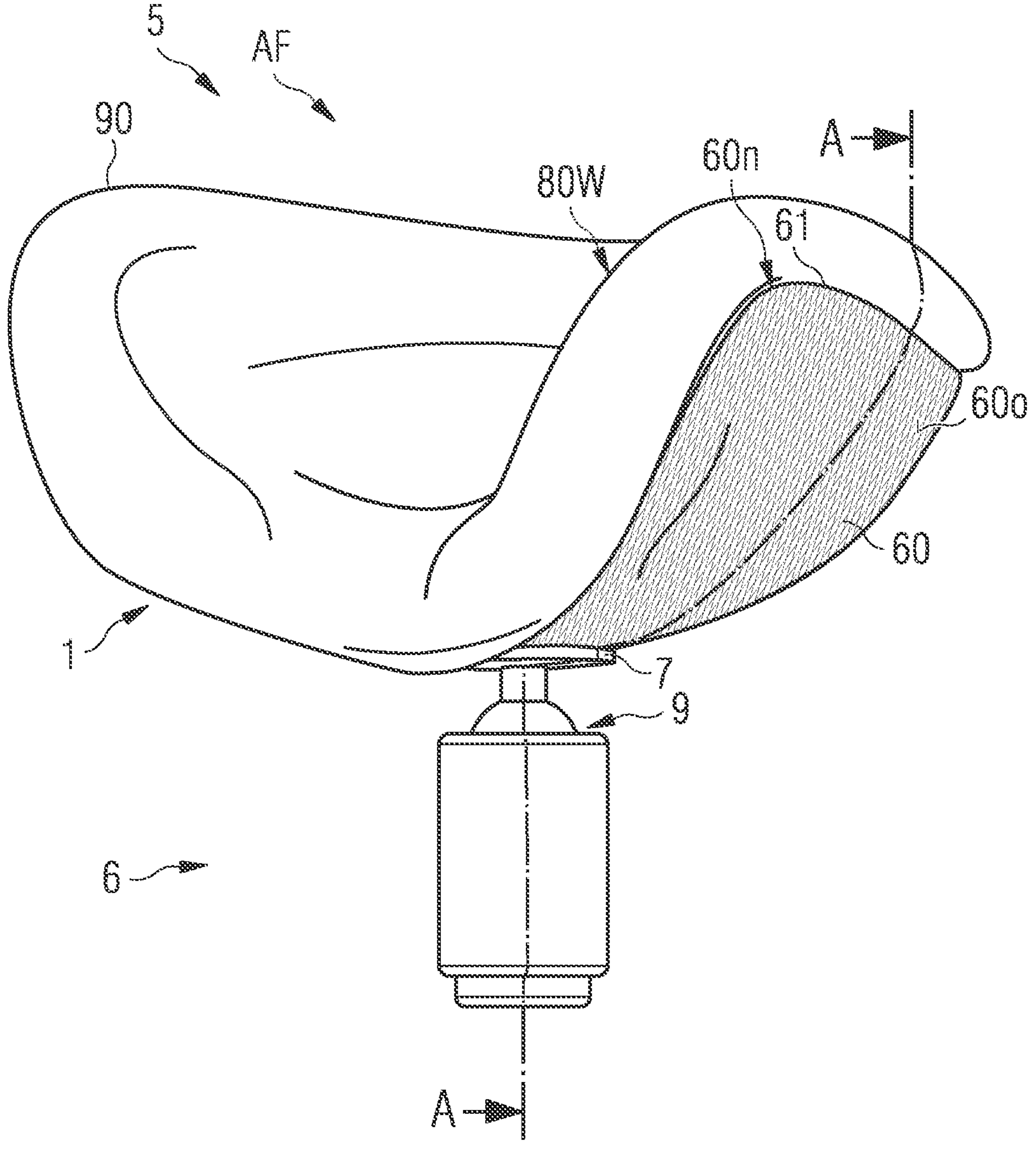
Figure 3:
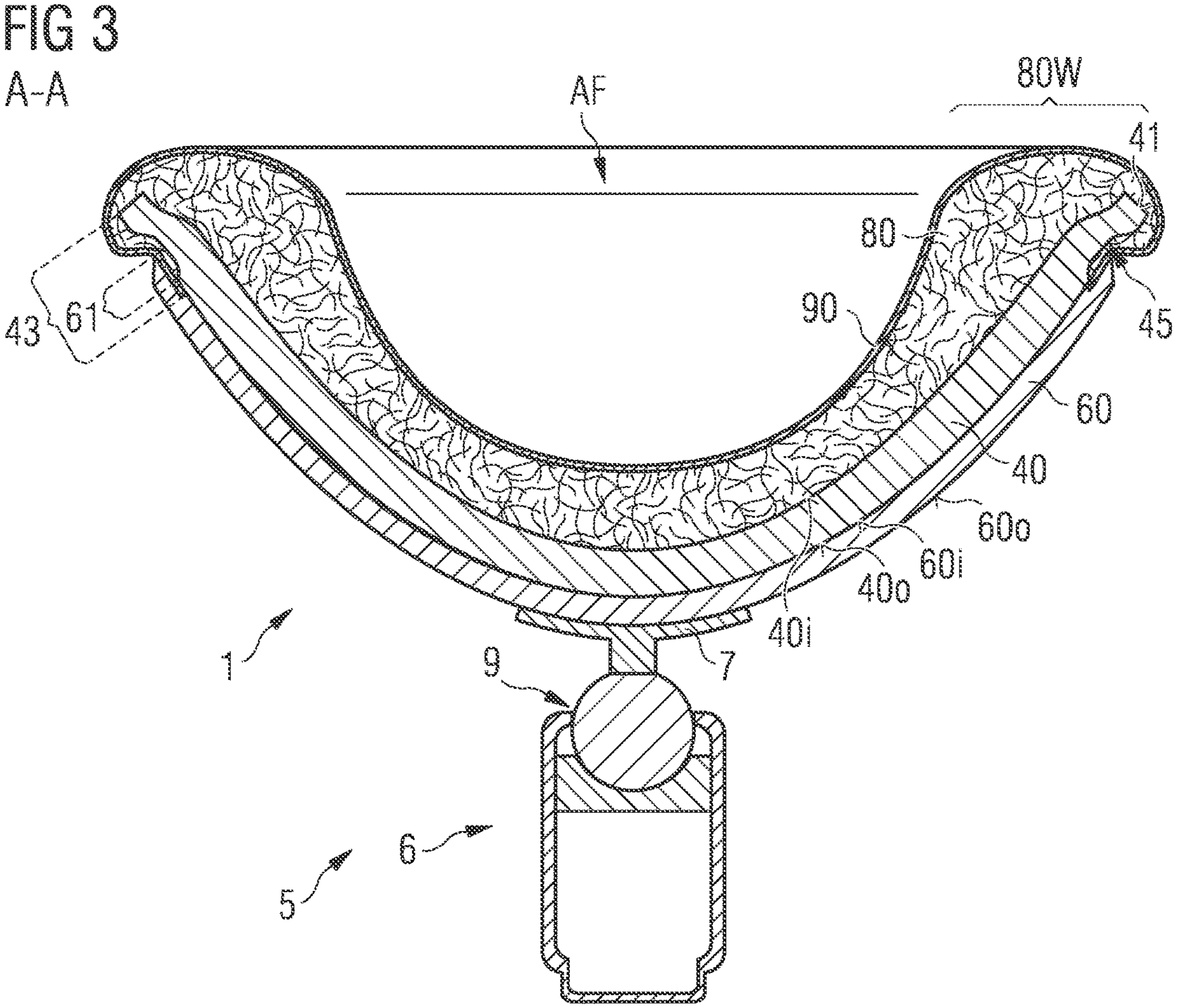

FIG. 2 shows a perspective view of an example of embodiment of a head cap for the head placement device in FIG. 1, FIG. 3 shows a schematic cross-sectional view through the example of embodiment of the head placement device according to the invention along section line A-A in FIGS. 1 and 2, looking into a head placement surface onto a closed quarter sphere part of the head cap.

Figure 4:
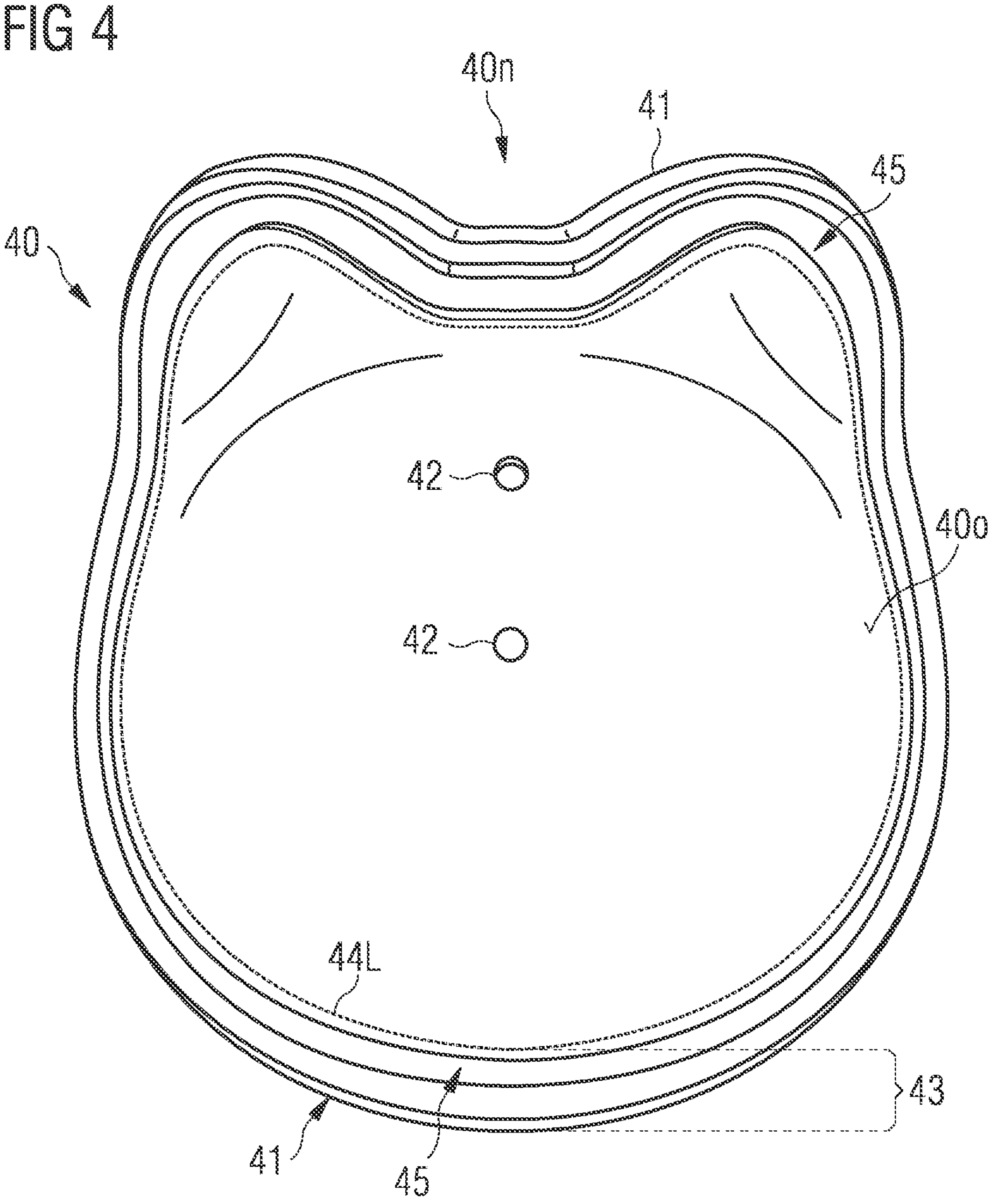
Figure 5:
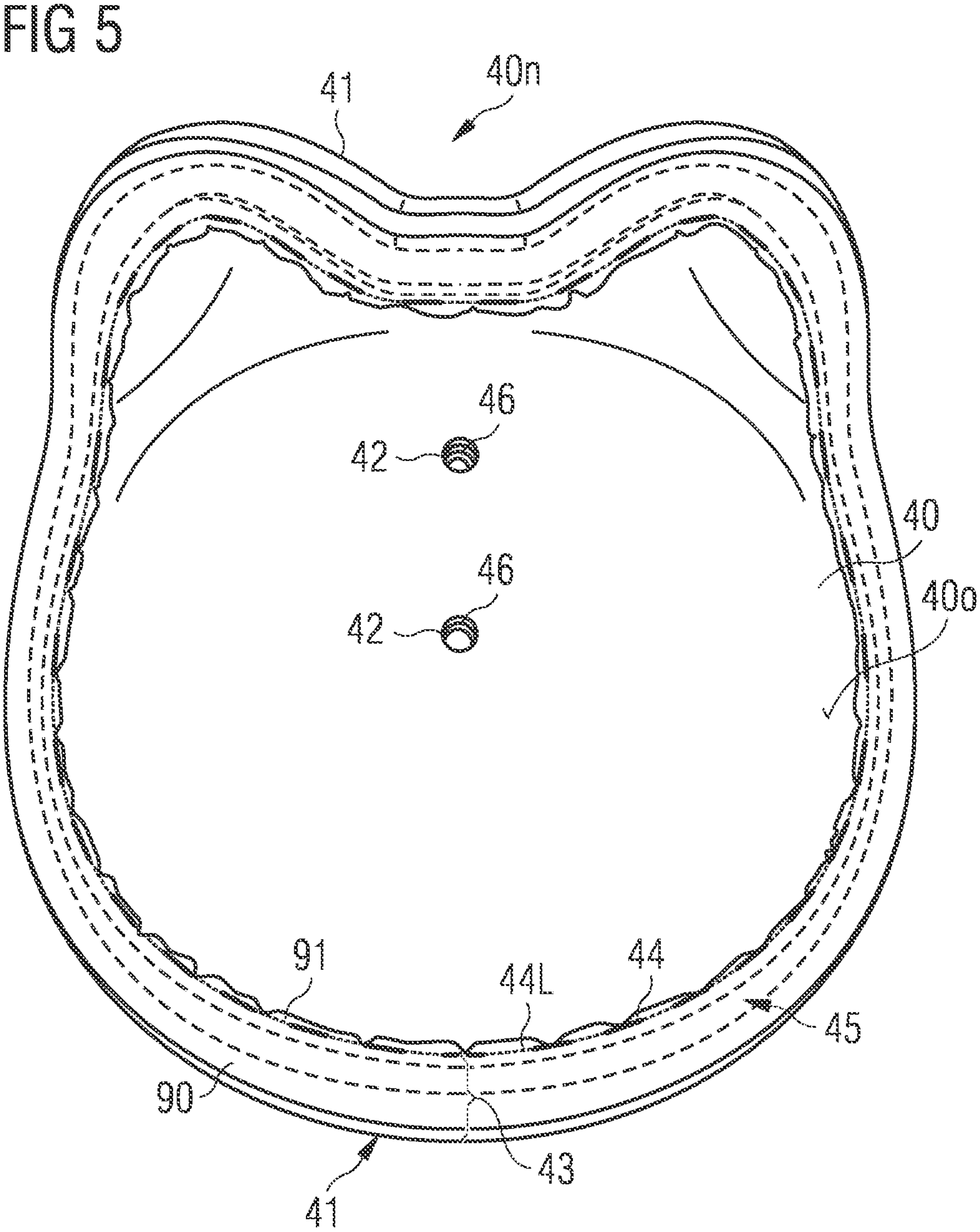
Figure 6:
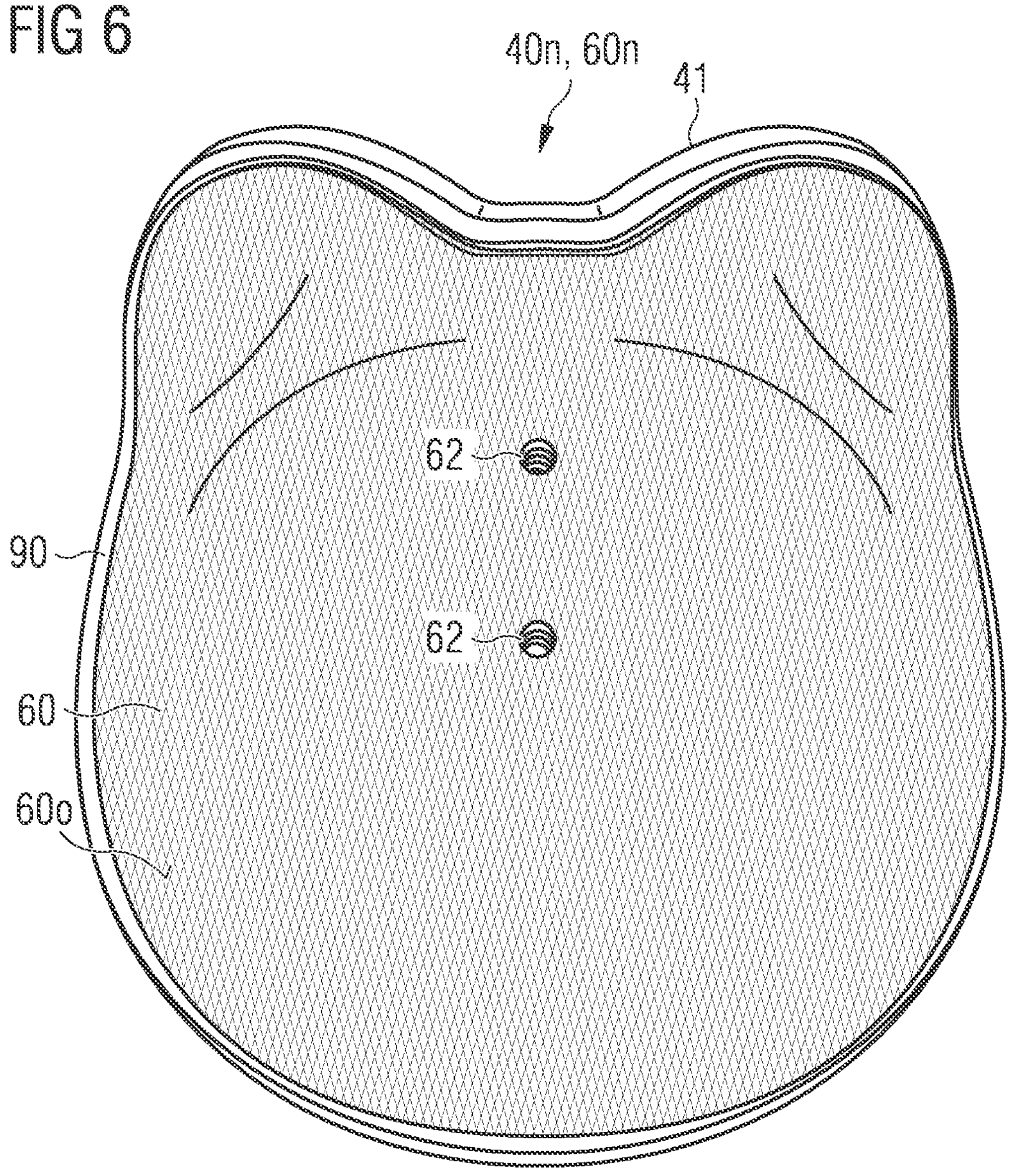

FIG. 4 shows a view from below of an outer side of the support shell of the head cap in FIGS. 2 and 3, FIG. 5 shows a view from below of an outer side of the support shell of the head cap in FIG. 4, with fastened cover layer pulled around the support shell, but without a cover shell, FIG. 6 shows a view from below of an outer side of the support shell of the head cap in FIG. 5 in a ready assembled state of the head cap with the cover shell.

In FIG. 1, as an example of an item of treatment furniture 10, a lateral view of a treatment table 10 or lifting table 19 is shown. In the following, direction statements such as “above”, “under”, “top”, “bottom”, “upper side”, “lower side”, “horizontal” and “vertical” relate to a correctly set up lifting table 10 in a space with the usual orthogonal spatial directions S1, S2, S3. The lifting table 10 comprises a longitudinal couch 29 (shown in longitudinal section) that comprises three body segments 27 and a head placement segment 5 (explanation below) for the placement of a patient or person. The body segments 27 are arranged in a line and essentially horizontally. They are each connected in a swivelling manner with the adjacent segments and can be aligned as required by way of positioning means 8, such as hydraulic positioning elements 8, for example.

The couch 29 is arranged on the top of a lifting column 20 (not shown in cross-section). The lifting column 30 comprises several feet 12 and a height-adjustable lifting body 25, on the top of which the body segments 27 of the couch 29 are arranged. The feet 12 underneath the lifting body 25 are on the one hand designed so that the lifting column 30 stands in an overall very stable manner and (not shown here) is firmly connected to the floor, i.e. anchored in the floor for example. On the other hand, the lifting body 25 can be displaced in terms of height relative the feet 12. In normal use the lifting column 30 can thus be adjusted in a lifting direction HR (spatial direction S2) perpendicularly to the floor, i.e. vertically, in order to position the person in a raised or lowered manner, i.e for height adjustment in the lifting direction HR. The spatial direction S2 is therefore also designated as the lifting direction HR. However, for example, in order to only raise or lower the upper body or lower body (relative to the other in each case), further positioning elements 8 are arranged on the lifting body 25 (left and right in FIG. 1) under the middle region of the couch 29.

So that the described components of the lifting table 10 do not have to be manually operated, inside a housing of the lifting body 25 there is a control unit 26 (only shown schematically in FIG. 1 as a dashed block) for controlling the lifting table 10, with which therefore the lifting body 25 can be positioned in a controlled manner relative to the feet 12, and in turn the body segments 27 by means of the positioning elements 8 relative to the lifting body 25. For this, the feet 12 and the positioning elements 8 are, for example, driven hydraulically, pneumatically and/or as simple gears, being regulated or actuated via the control unit 26. Accordingly, it comprises suitable components, for example in the form of an electrical switch, an FPGA (Field Programmable Gate Array) and/or a microprocessor. In addition, for better operability, it can also comprise operating elements applied on the outside of the housing and/or a remote control.

At the head end (on the left in FIG. 1) of the couch 29, as a separate head placement segment 5 there is a head placement device 5 with a head cap 1 (also not shown in cross-section). This comprises a holding mechanism 6 with a ball joint 9 and a positioning element 8 through which the head cap 1 is connected in an articulated manner with the adjoining body segment 27 (for the upper body). FIG. 2 shows an isolated (further enlarged) view of a part of the head placement device 5, in which in addition to the head cap 1 (as a component of this head placement device 5), the ball joint 9 can be seen as part of the holding mechanism 6 for the head cap 1. A coupling option, e.g. a thread for a screw connection or a snap-in or click connection between the ball joint 9 and support frame 11 of the head placement device 5, wherein the support frame 11 is in turn coupled to the positioning element 8, is located on the underside of the holding mechanism 6 which faces away from the head cap and is not visible here. Alternatively, the positioning element 8 can also be directly connected to the ball joint. The ball joint 9—only shown schematically for the sake of simplicity—that can be fixed or locked with a (not shown) inner releasable “socket type” clamping mechanism, ensures that the head cap 1 can be arranged in any manner. For this, for example, the clamping mechanism can be designed with a locking screw or a rotationally tightenable grip applied on the outside of the holding mechanism 6. Overall, through this, the head cap 1, particularly also with the head placed therein, can be arranged or positioned with the positioning element 8 along the three orthogonal spatial directions S1, S2, S3, as well as by means of the ball joint 9 along the direction of rotation about the longitudinal direction (spatial direction S1) of the lifting table 10 and along the direction of rotation R2 about the spatial direction S3 perpendicular to the longitudinal direction of the lifting table 10.

So that the head of the person is held and guided accordingly, including during positioning, the head cap 1 has a head support surface AF matched to a conventional back of the head and uppermost neck area, in order to support or hold this comfortably and securely. However, in the head cap 1 shown here, not only the back of the head can supported. Rather, with the particularly advantageous shape shown here, the head cap 1 is also suitable for use as a face cap. This is because the face can be placed in it particularly comfortably as the forehead has a similar curvature to the back of the head. Basically, the inner shape or head support surface AF of the head cap 1 can in a representative manner simply be presented as the counterpart to the back of the head and uppermost neck area, for which reason, for the sake of simplicity, the head cap is described below with reference to the back of a head.

In addition, the head resting surface AF can be divided into two moulded sections. As stated, these are each shaped in accordance with the envisaged part (of the skull or neck) that rests there during intended use.

A "quarter sphere" moulded section of the head support surface AF of the head cap 1 for receiving and placement of the parietal bone of the person can be seen in the cross-sectional view in FIG. 3. FIG. 3 shows the view into or onto this rear part (behind the section line A-A in FIG. 2) of the head support surface AF or the head cap 1 from the direction of the cough 29 (see FIG. 1).

From there the head cap 1 transitions smoothly into the other moulded section (similar to a quarter sphere) with a nape cut-out for receiving the neck (for this see the head support surface AF open at the front left in FIG. 2). If the head of the person is pointing with the face towards the head cap, the nape cut-out provides space for the nose or the mouth, as well as the chin of the person and thereby advantageously supports the bridge of the nose. In this case it could also be called a "nose cut-out". The nape cut-out 40*n*, 60*n* (see FIG. 6) is composed of a nape cut-out 40*n* in the support shell (see FIG. 4) and an almost identical, slightly smaller nape cut-out 60*n* in the cover shell 60 (see FIG. 2), which each in moulding terms constitute an approximately gaussian bell-shaped recess or indentation in the shells 40, 60. designed to hold the occipital bone, a part of the parietal bone and laterally on each side (left and right) the temporal bone. Furthermore, the nape cut-out 40*n*, 60*n* of the moulded section creates just enough space for the neck/uppermost nape area that the neck can also be held in a supported manner. A slight rise formed in the support shell 40 (from the central inner face or the centre of the head support surface AF of the head cap 1 in the direction of the nape cut-out) is adapted to the usual shape of the back of the head so that in an intended arrangement the head, at least as far as the first cervical vertebra (atlas), is held in a supported manner. The support of this neck area makes for noticeably more comfortable and secure placement in the head cap 1.

In summary, the inner shape of the head support surface AF of the head cap 1 is, as has been stated, shaped so that it constitutes as good a negative mould or copy of a usual back of the head and neck area of an adult person (or of a child in the case of a child head cap) as possible. In the case of an ideal (usual) head shape, almost the entire rear side of the head (occipital bone, parietal bone and neck or uppermost neck area) rests flatly in the head support surface AF so that the weight of the head is distributed over the entire head support surface AF. In this way it is prevented that the head is only in contact at individual points, as a result of which during longer use pressure points or similar would form, which would of course be experienced as uncomfortable by the person.

Particularly from FIG. 2 it can be seen that the cap-shaped, curved head support surface AF of the head cap 1 is intended to surround the back of the head (not shown for reasons of clarity), i.e. to also hold it laterally. The side surfaces of the head resting surface AF required for this, enclose this support surface (or, during use, the head) almost on all sides (radially outwards) in a parabolic manner (open upwards), rising concavely in the form of an "slope". "Almost on all sides" means the "circumference of the head" from one ear, via the top of the skull to the other ear, i.e. approximately three quarters of the circumference of the head without the width of the neck.

A back of the head placed in the head cap 1 is thus held from behind in a hood-like manner to just behind the ears. Accordingly, the slope predominantly (approximately on three quarters) rises up to the ears (temporal bone level) and in the remaining quarter is almost flat with a minimal slope around the neck. Left out in this quarter is the already mentioned nape cut-out, which will be explained in more detail below.

At the top, the slope of the head support surface AF is circumferentially round (convex towards the top), i.e. becoming flatter towards the outside. From this slope that is convex at the top, the curvature inverts downwards to a lower slope area. There it is then curved concavely (upwards). At the transition point at approximately half the slope height, the gradient in the quarter sphere moulded section is very steep.

In the second moulded section, i.e. in the area of the nape cut-out, the gradient is very shallow. This shallow increase (relative to the midpoint of the head support surface AF) is inspired by the course of a neck resting thereon. It increases to the point where the start of the first neck vertebra (atlas) comes to rest. Here too the shallows slope is again curved convexly (upwards). This minimally visible, raised sill in the course of the slope provides support there where the neck or the spine is slightly curved to the larynx. Perpendicularly to the neck, the nape cut-out is also adapted to the neck, i.e. selected to only be so wide that the neck of a normal adult has just enough space therein to still also support or hold the neck laterally.

At the start of the nape cut-out 40*n*, the outer edge 41 of the support shell 40 extends from an otherwise constant level symmetrically in a gaussian bell-shaped manner in each case (i.e. convexly, concavely, convexly) down to a level for the rear side of the neck, as well as from both sides in a slight arc in the direction of the midpoint of the head support surface AF of the head cap 1. In order to improve the receiving or placement of the person's neck or rear of the neck even further, in the area of the nape cut-out 40*n*, the outer edge 41 of the support shell 40 is slightly bent, turned or curved towards an outer face 40*o* of the support shell 40, i.e. away from the neck (for this see the upper section, only thereby visible in FIG. 4, of the outer edge 41, which is slight turned or twisted towards the observer).

By way of example, using FIGS. 2 to 6, the method of production according to the invention will be described below. Especially in FIG. 3, which shows the cross-section through the head support surface AF of the head cap 1 along section line A-A in FIGS. 1 and 2, the complete layer or shell structure of the head cap 1 can be particularly well seen.

As can been seen from the cross-section, the layer or shell structure comprises as an inner, bearing or dimensionally stable basic shell, a cap-shaped support shell 40 with a concave inner face 40*i* and a convex outer face 40*o*, which is produced in a first step (in FIG. 4 a view of the underside or outer face 40*o* facing away from the head is shown). As stated, this support shell 40 is shaped in the form of cap, i.e. a curved surface of a spherical segment with a circular circumference. The wall thickness of the support shell is small relative to the total diameter of the cap. Between the inner face 40*i* and the outer face 40*o* of the support shell 40, the (peripheral) outer edge 41 of the support shell (40) is designed to end with a relatively sharp edge.

In the support shell edge region 43, close to this outer edge 41 of the support shell 40, a (circumferential) recess strip 45 is formed or removed in the outer face 40*o* of the support shell 40. The depth of the recess strip 45 is only around one fifth in relation to the support shell wall thickness.

In addition, in the outer face 400 of the support shell 40, at each of two points, fastening holes 42 (preferably with a thread 46) extending in the radial direction perpendicularly to the surface of the support shell 40 are bored or milled as simple fastening means for attaching the aforementioned holding mechanism 6. The fastening holes 42 are spaced with regard to each other along the degree of longitude that extends from a point (aphelion) remote from the nape cut-out of the outer edge 41 of the support shell 40 in a curved manner along the outer face 40*o* to a midpoint of the nape cut-out 40*n* of the support shell 40.

As can be seen in FIG. 3, adjoining the convex outer face 40*o* of the support shell 40 is a further dimensionally stable, cap-shaped cover shell 60, similar in shape to the support shell 40. It is (see also FIG. 2 or 6) essentially matched to the support shell 40, i.e. also shaped so that it comprises a convex outer face 60*o* and a concave inner face 60*i*. However, overall, the cover shell 69 is designed a little smaller, but with a slightly larger curvature angle in order, during the intended connection of the two shells 40 60 (explained further below) to be able to clamp in between them the cushion layer 80 described below and the cover layer 90.

However, for cushioning the inner face 40*i* as well as the outer face 40*o* as far as a support shell edge region 43, said cushion layer 80 is cut to shape and size with a little excess and then, as required, arranged and, for example, adhered in one or more thin layers on the support shell 40. For this, the cushion layer 80 could alternatively be foamed as an elastic mass onto the inner face 40*i* of the support shell 40.

For enclosing the cushion layer 80 as far as a support shell edge region 43 of the support shell 40, the flexible cover layer 90 is then also cut to a similar shape and size from the corresponding material.

On the side of the cushion layer 80 facing away from the support shell, i.e. facing the head, the cut cover layer 90 is then placed on the cushion layer 80 and adhered to it. A peripheral overhang or overlap of the cushion layer 80 and the cover layer 90 above it consequently protruding beyond the outer edge 41 of the support shell 40, is then under slight tension pulled by means of the cover layer 90 around the outer edge 41 to a rear-sided support shell edge region 43 of the outer face 40*o* of the support shell 40.

As can be particularly well seen in the finished state in accordance with FIG. 2, the cushion layer 80 enclosed by the cover layer 90 therefore almost automatically forms an inner, i.e. located between the support shell 40 and the cover layer 90, cushion bulge 80W. This arches laterally slightly over the peripheral outer edge 41 of the support shell 40, as can be seen in FIG. 3 to the right and left of the respective outer edge 41. In this way, both the inner face 40*i* and also the outer face 41 of the support shell 40 is cushioned with the cushion layer 80 and through covering with the cover layer 90 is brought into the desired shape or preformed.

Thereupon, a cover layer edge 91 of the cover layer 90 is essentially connected to the support shell 40 along an imagined circumferential line 44L on the outer face 40*o* of the support shell 40. As an example, FIG. 5 shows a cover layer edge 90 firmly stapled with fastening staples 44 onto the support shell 40 along the line 44L.

The cover layer 90 or at least the peripheral cover layer edge 91 is then additionally fastened to the cover shell 60 as has already been done in FIG. 6. For this, the faces facing each other (i.e. the outer face 40*o* of the support shell 40 and/or the inner face 60*i* of the cover shell 60), are over the entire surface, or at least partially (i.e. in strips), preferably at least essentially in the area of line 44L, coated with adhesive and pressed onto each other or pressed and thereby adhered to each other. When covering the cover layer edge 91 with the cover shell 60, an edge 61 of the cover shell 60 presses the cover layer 90 against the support shell 40 so that a circumferential cushion bulge 80 is re-tensioned and smoothed by the cover 90 in the area of the outer edge 41 of the support shell 40. More precisely, with its peak, the edge 61 of the cover shell 60 protrudes into the recess strip 45 and in this way tensions the already slight pre-tensioned cover layer 60 further so that the cover layer 60 can be tensioned around the circumferential cushion bulge 80W covering the inner face 40*i* of the support shell 40 in an even more fold-free manner.

Alternatively, as required, the cover layer 90 could also fixed and tensioned without stapling, i.e. only by way, for example, of the adhered-on cover shell, essentially along the line 44L between the support shell 40 and cover layer 60.

In the support shell edge region 43 on the outer face of the support shell 40, the cover shell 80 then closes a joint to the cover layer 90 in an almost flush manner with the outer edge 41 of the support shell 50 or with the enclosed cushion bulge 80W projecting slightly beyond the outer edge 41 of the support shell 40.

Even covering the cover layer 90 with the cover layer 60 inevitably forms a seal. Adhering the shells 40, 60 to each other ensures additional sealing so that in intended use no fluids or suchlike can penetrate into the minimal "joint" between the cover layer 90 and cover shell 60. It is sufficient if the adhesive is applied peripherally in strips essentially along the line 44L as the corresponding components are tightly in contact with each other.

Finally, a mounting disk 7 of the ball joint 9 is fastened to the outer face 600 of the cover shell 60 by means of two screws in the respective thread 46 in the fastening holes 42 of the support shell 40 as well as the fastening holes 62 (see FIG. 6), as can be seen in the ready assembled state in FIGS. 2 and 3. As the fastening screw 7 also has slightly curved surface here, it lies flush on the outer face 60*o* of the cover shell 60.

In the above-described production process the material for the support shell 40 can—as has already been described—be purchased in the form of sheet or film material, pre-prepared in the form of material cut to size, then thermoformed, milled and then, if applicable, surface-treated.

The support shell 40 and the cover shell 60 can be made of the same full material or raw material, such as, for example, acrylonitrile butadiene styrene copolymer (ABS), polyurethane (PU), polycarbonate (PC), polyvinyl chloride (PVC), wood, metal or suchlike. More particularly, however, the outer face 60*o* of the cover shell 60 can be made of a particularly smooth material or be additionally smoothed, so that the risk of residues adhering to it is reduced.

Finally, it is again pointed out that the devices that are described in detail above are only examples of embodiments which can be modified in the most varied of ways by a person skilled in the art without departing from the domain of the invention. Thus, for example, other items of treatment furniture such as couches etc. are also covered by the scope of the invention. Furthermore, the use of the indefinite articles "a" or "an" does not preclude the fact that the respective feature can also be multiply present. Equally, the terms "element" and "device" do not rule out the fact that the respective components can comprise several interacting partial components that may also be spatially distributed.

LIST OF REFERENCE NUMBERS

1 Head cap/head placement segment
5 Head placement device
6 Holding mechanism
7 Mounting disk
8 Positioning means/positioning elements
9 Ball joint
10 Treatment furniture/treatment table/lifting table
11 Support frame
12 Feet
25 Lifting body
26 Control unit
27 Body segments
29 Couch
30 Lifting column
40 Support shell
40*i* Inner face of support shell
40*n* Nape cut-out of the support shell
40*o* Outer face of the support shell
41 Outer edge of the support shell
42 Fastening holes
43 Support shell edge region
44 Fastening clamps
44L Line
45 Recess strip
46 Thread
60 Cover shell
60*i* Inner face of the cover shell
60*n* Nape cut-out of the cover shell
60*o* Outer face of the cover shell
61 Edge of the cover shell
62 Fastening holes
80 Cushion layer
80W Cushion bead
90 Cover layer
91 Cover layer edge
AF Head resting surface of the head cap
HR Lifting direction
R1, R2 Directions of rotation
S1, S2, S3 Spatial directions
A-A Section line

The invention claimed is:

1. A head cap for placement of a head of a person, comprising:
a support shell with an inner face facing the head and an outer face facing away from the head, and
a cover shell including an inner face facing the head and an outer face facing away from the head,
wherein at least the inner face of the support shell at least along an outer edge of the inner face is, over the entire surface, cushioned with a cushion layer,
wherein a flexible cover layer covering the cushion layer encloses the inner face of the support shell and extends up to the outer face of the support shell at least in a peripheral support shell edge region, and
wherein at least one cover layer edge of the flexible cover layer is covered by the cover shell.

2. The head cap according to claim 1, wherein the peripheral support shell edge region of the support shell enclosing a part of the cover layer is connected at least with a peripheral edge of the cover shell, adhered and/or welded and/or pressed and/or screwed to the cover shell and/or the cover layer.

3. The head cap according to claim 1, wherein the cover layer at least on the inner face of the support shell is designed to be seamless, and wherein the cover layer in the region of a peripheral line along the cover layer edge is fastened to the support shell, wherein this line is covered by the cover shell.

4. The head cap according to claim 1, wherein the outer face of the support shell is protected against surroundings of the head cap as a whole by the cover shell and the cover layer, wherein the cover shell is connected to in a tightly sealed manner to the cover layer.

5. The head cap according to claim 1, comprising a recess strip in the support shell edge region of the support shell for receiving an edge of the cover shell.

6. The head cap according to claim 1, wherein the support shell and the cover shell comprise at least one fastening hole assigned to each other.

7. A head placement device with a head cap according to claim 1, and a holding mechanism for the adjustable positioning of the head cap at least in two spatial directions and/or at least in two directions of rotation.

8. A head placement device according to claim 7, wherein the holding mechanism comprises positioning means for positioning the head cap in three orthogonal spatial directions, and/or a ball joint.

9. Treatment furniture comprising a treatment table or a treatment chair with a head cap according to claim 1 and a head placement device.

10. A process for producing a head cap according to claim 1, wherein the process covers at least the following steps:
provision of a support shell,
provision of a cover shell,
provision of a flexible cover layer and a cushion layer,
cushioning, at least along an outer edge of an inner face of the support shell with the cushion layer,
covering of at least one inner face of the support shell with the cover layer including enclosing at least one support shell edge region of an outer face of the support shell, and
covering at least one cover layer edge with the cover shell on the outer face of the support shell.

11. The process according to claim 10, comprising forming the support shell and/or the cover shell using thermoforming of a recess strip in a support shell edge region of an outer face of the support shell.

12. The process according to claim 10, wherein the cover layer is placed in a recess strip in the support shell edge region of the support shell so that in the ready assembled state, the recess strip is at least partly spanned by the cover layer, wherein sealing between the cover shell and the cover layer in the region of the recess strip inevitably occurs under slight pressure when connecting the cover shell to the support shell.

13. The process according to claim 10, wherein a peripheral edge in the area of a nape cut-out of the cover shell is formed in such a way that the edge in the connection between the support shell and cover shell in the ready assembled state tightly rests on the cover layer in the recess strip over almost the entire surface.

14. The process according to claim 10, wherein the head cap is cushioned with the cushion layer in such a way that by way of the cushion layer extending beyond an outer edge of the support shell a cushion bulge is formed.

15. Use of a head cap according to claim 1 for placement of a head of a person when being placed on a treatment furniture.

16. The head cap according to claim 2, wherein the cover layer at least on the inner face of the support shell is designed to be seamless, and wherein the cover layer in the region of a peripheral line along the cover layer edge is fastened to the support shell, wherein this line is covered by the cover shell.

17. The head cap according to claim 2, wherein the outer face of the support shell is protected against surroundings of the head cap as a whole by the cover shell and the cover layer, wherein the cover shell is connected to in a tightly sealed manner to the cover layer.

18. The head cap according to claim 3, wherein the outer face of the support shell is protected against surroundings of the head cap as a whole by the cover shell and the cover layer, wherein the cover shell is connected to in a tightly sealed manner to the cover layer.

19. The head cap according to claim 2, comprising a recess strip in the support shell edge region of the support shell for receiving an edge of the cover shell.

20. The head cap according to claim 3, comprising a recess strip in the support shell edge region of the support shell for receiving an edge of the cover shell.

* * * * *